Jan. 23, 1968  F. H. MUELLER ETAL  3,364,554
APPARATUS FOR REMOVING A FIRE HYDRANT STEM COUPLING
Filed Aug. 3, 1964  3 Sheets-Sheet 1
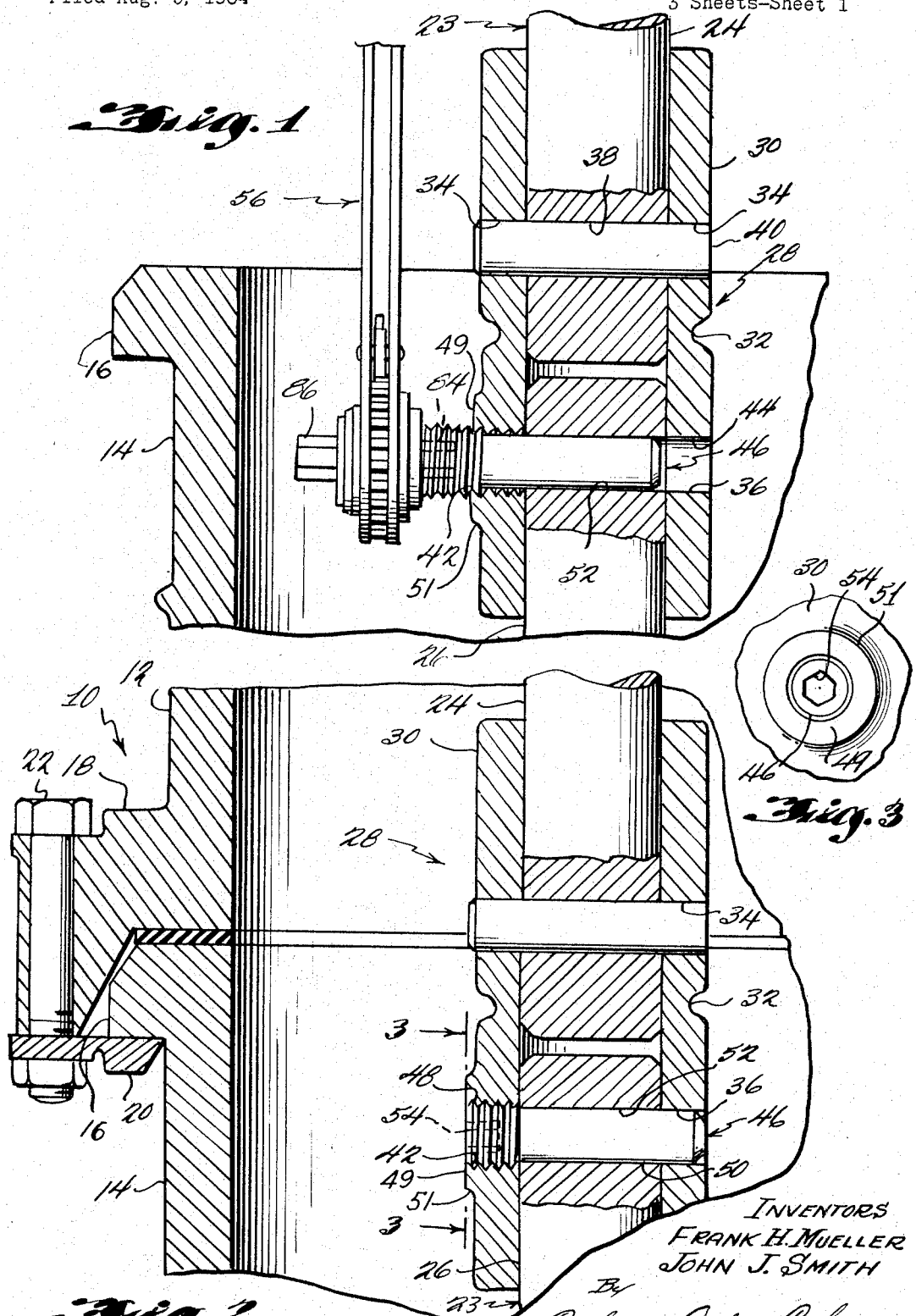
INVENTORS
FRANK H. MUELLER
JOHN J. SMITH
By
Cushman, Darby & Cushman
ATTORNEYS

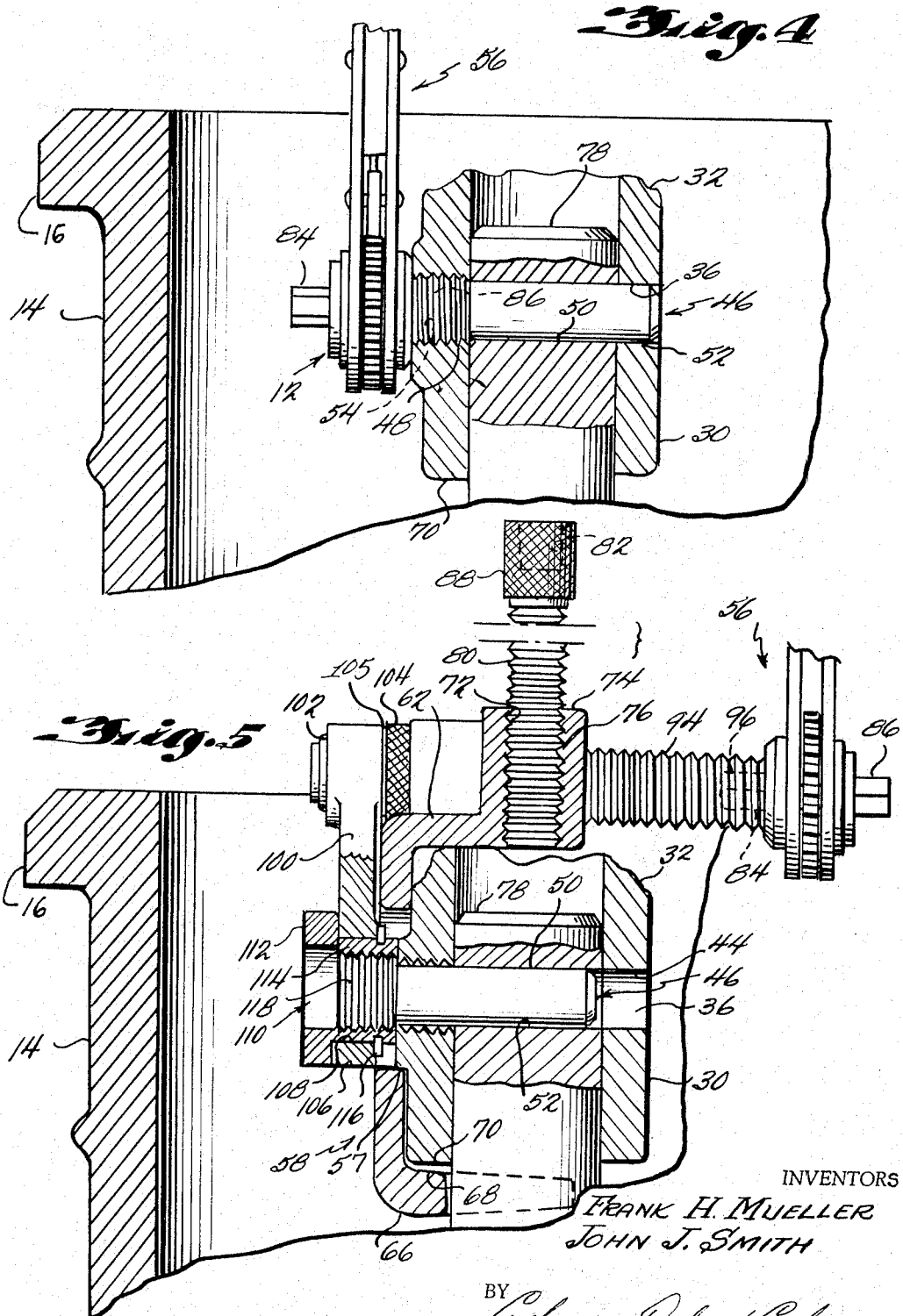

Jan. 23, 1968   F. H. MUELLER ET AL   3,364,554
APPARATUS FOR REMOVING A FIRE HYDRANT STEM COUPLING
Filed Aug. 3, 1964   3 Sheets-Sheet 3
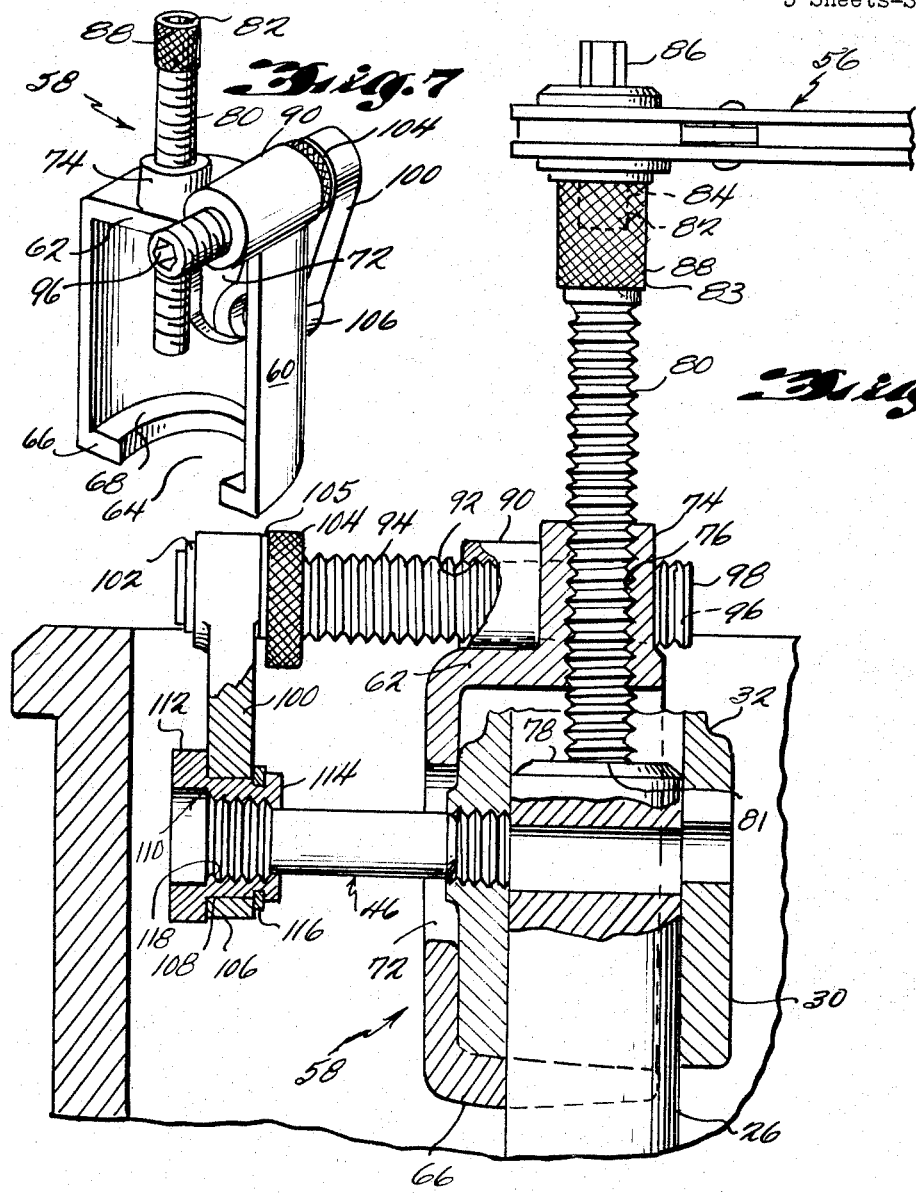
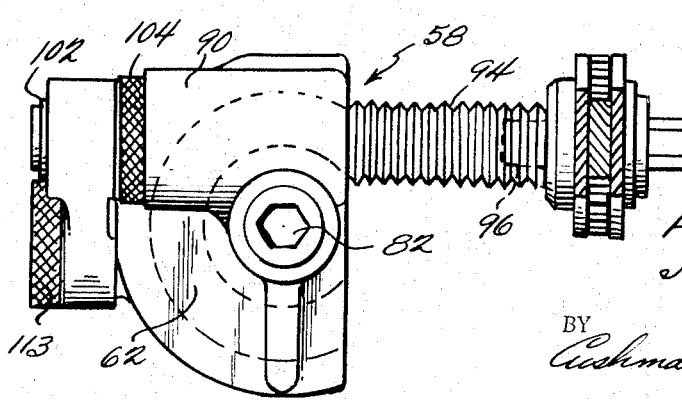
INVENTORS
FRANK H. MUELLER
JOHN J. SMITH
BY
Cushman, Darby & Cushman
ATTORNEYS

# United States Patent Office
3,364,554
Patented Jan. 23, 1968

3,364,554
APPARATUS FOR REMOVING A FIRE HYDRANT STEM COUPLING
Frank H. Mueller and John J. Smith, Decatur, Ill., assignors to Mueller Co., Decatur, Ill., a corporation of Illinois
Filed Aug. 3, 1964, Ser. No. 387,159
10 Claims. (Cl. 29—213)

ABSTRACT OF THE DISCLOSURE

An apparatus for removing the coupling pin and damaged sleeve portion from coupling engagement with the lower section of a two section valve stem in a fire hydrant, the apparatus including a tool having an elongated body member for abutting the damaged sleeve and for engaging the damaged sleeve at one end thereof, the body member carrying a first force applying member for gripping the pin and at least partially withdrawing the same from the stem and damaged sleeve portion and a second force applying member for applying a force downwardly to the stem whereby the sleeve is moved longitudinally off of the stem.

---

The present invention relates to an improved tool for removing the coupling pin and the damged frangible sleeve portion of a fire hydrant stem coupling. More particularly, present invention relates to a tool for disconnecting the coupling to the lower section of the plural section valve stem of a fire hydrant.

Fire hydrants have heretofore been made with plural barrel sections, the lower of the barrel sections being buried partially in the ground and housing a hydrant valve, and the upper of the barrel sections being detachably connected to the lower barrel section by means of a frangible sectional coupling ring. One such coupling ring is disclosed in our prior United States Patent 3,002,-775, issued October 3, 1961, whereas another such frangible coupling ring for hydrant barrels is disclosed in the copending application of Frank H. Mueller and Oscar E. Brown, serially numbered 848,319 and filed October 23, 1959. When a fire hydrant utilizes sectional hydrant barrels coupled by frangible parts, the valve stem of the hydrant is made in sections and must also be provided with a replaceable frangible coupling between the same. Such couplings have been heretofore known in the art and fire hydrants of this type may be knocked over by a vehicle or the like without the escape of water and then usually reassembled merely by replacing the frangible parts. Of course, if the upper barrel section or the upper valve stem section is damaged, this part is also replaced, but as mentioned above, this does not normally occur.

Among the frangible valve stem couplings heretofore used for connecting opposed upper and lower valve stem sections, there has been the sleeve type coupling in which the lower end of the upper section of the valve stem and the upper end of the lower section of the valve stem fit concentrically within a tubular sleeve, the sleeve being pinned to both sections by means of force-fitted pins. While this type of coupling has been widely used, it does have a decided disadvantage as the force-fitted coupling pin remaining in the sleeve and the upper end of the lower section of the valve stem often-times became rusted or frozen in place. As a result the water to the valve for the hydrant had to be cut off so that the lower section of the valve stem and the fractured lower part of the coupling sleeve could be removed from the hydrant and returned to a repair shop where the pin was removed or driven out of the lower section of the valve stem. There is very little room in the lower barrel of a hydrant, and thus it did not provide adequate room for easy removal of the coupling pin axially through the bores of the coupling sleeve and valve stem parts, especially where there was an unusually tight fit. In the type of sleeve coupling using a bolt or stud having threads along part of its length, the same difficulties exists in the disassembly of the stem coupling where the threadless portion of the bolt or stud had an initial tight fit or where it rusted and became frozen prior to removal.

Accordingly, it is an object of the present invention to provide an improved frangible coupling sleeve embodying improved coupling pins enabling easier initial installation and removal of the same at the site of the fire hydrant and the tool for performing the removal operation.

Still ancillary to the preceding objects, it is a further object of the present invention to provide an improved tool capable of use in removing a coupling pin from a coupling sleeve and the lower section of a valve stem, especially when the coupling is of the improved type having threads along a part of the same for positively retaining the pin in position with the remaining part of the pin being unthreaded and having a tight fit with the unthreaded portions of the bores in the stem and coupling sleeve.

A further object of the present invention is to provide an improved tool capable of being used to remove coupling pins, having threads on a portion of the same, from a frangible coupling sleeve which has been damaged, the tool being so designed that after removal of a coupling pin, the same tool can be used to remove the damaged coupling sleeve on the lower valve stem without removing or changing the position of the tool, thus eliminating the necessity for more than one tool which will operate within the confines of the lower hydrant barrel.

Ancillary to the immediately preceding object, it is a further object to provide a tool also capable of removing the damaged portion of the sleeve on the upper valve stem after the coupling pin has been removed.

Still a further obqect of this invention is to provide an improved tool which may be used to remove coupling pins from the lower sleeve portion of a coupling in a fire hydrant in such a manner that the pin is retained by the tool during and after its removal so that the pin will not be dropped into the valve section of the hydrant either during its removal from the sleeve or during the subsequent removal of the sleeve from the stem by the same tool.

Another object of the present invention is to provide a fire hydrant with an improved frangible coupling for connecting parts of a plural section valve stem together, the coupling sleeve having a weakened portion positioned below the upper end of the lower barrel section of the hydrant as is the upper end of the lower section of the valve stem so that should the hydrant be knocked over, the wheel of a passing vehicle is not apt to engage the lower section of the valve stem and damage it or the hydrant valve by knocking the same off of its seat.

These and other objects and advantages of the present invention will become more apparent from the following description in the specification, claims, and accompanying drawings in which:

FIGURE 1 is a fragmentary view partly in vertical section of a fire hydrant, the upper barrel being omitted for purpose of clarity, the fire hydrant having a frangible stem coupling embodying the present invention. The view further illustrates the insertion of the coupling pin into the bores of the lower part or section of the valve stem and the coupling sleeve with a ratchet wrench;

FIGURE 2 is a fragmentary view corresponding to FIGURE 1 but further illustrating the upper barrel of the fire hydrant connected to the lower barrel by a frangible sectional ring type barrel connection, and illustrating the improved coupling pin fully inserted and threaded into the bores of the coupling sleeve and the lower section of the valve stem;

FIGURE 3 is a fragmentary view taken substantially on the line 3—3 of FIGURE 2 and illustrating the boss on the exterior of the coupling sleeve surrounding the bore of the same;

FIGURE 4 is a view similar to FIGURE 2 but illustrating the hydrant parts remaining once the hydrant has been subjected to a fracturing blow, the view further illustrating an initial step in the method of removing the coupling pin from the fractured coupling sleeve and the bore of the undamaged lower section of the valve stem;

FIGURE 5 is a view similar to FIGURE 4 but illustrating a further step in the method of removing the coupling pin with the use of the improved tool when the unthreaded portion of the pin or bolt has a tight fit and after the threads of the same are clear of the threads in the bore of the sleeve;

FIGURE 6 is a view similar to FIGURES 4 and 5 but illustrating a further step in the method of removing the coupling pin with the use of the improved combination tool and showing the use of the tool to remove the damaged coupling sleeve from the lower valve stem;

FIGURE 7 is a perspective view of the tool; and

FIGURE 8 is a top view of the tool.

Referring now to the drawings where like reference numerals and characters represent like or similar parts, there is disclosed in FIGURES 1 and 2 a fire hydrant having a plural section hydrant barrel 10 comprising an upper barrel section or part 12 and a lower barrel section or part 14. The barrel sections 12 and 14 are secured together in end to end relationship by means of a rupturable or fracturable joint including the peripheral flanges 16 and 18 fastened together by a frangible sectional coupling ring 20 and the bolts 22. A more complete disclosure of the fire hydrant braker flange is disclosed in the aforementioned copending application Serial No. 848,319 and therefore is not repeated herein.

A valve stem 23 extends longitudinally within the barrel sections 12 and 14 and includes an upper valve stem section or part 24 and a lower valve stem section or part 26. The upper section 24 extends upwardly through the upper barrel section 12 and is provided at its upper end with means for operating the hydrant in the usual manner and the lower valve stem section 26 extends downwardly and is connected to the usual hydrant valve (not shown).

As shown in FIGURES 1 and 2 the upper and lower sections 24 and 26, respectively, of the valve stem 23 are coupled together by a frangible coupling generally indicated at 28. The frangible coupling 28 comprises a tubular sleeve 30 having an inside diameter to slidingly receive the lower end portion of the upper stem section 24 and the upper end portion of the lower stem section 26. Additionally, the sleeve 30 is provided with a circumferential groove or weakened portion 32 disposed about its periphery, the groove being positioned substantially intermediate the ends of the sleeve. When the coupling sleeve 30 is secured in position to the lower and upper ends of the upper and lower valve stem sections 24 and 26, respectively, it will be noted that the weakened portion or groove 32 as well as the upper end of the stem section 26 are below the plane of the upper edge of the lower barrel section 24. Thus, should the hydrant 10 be knocked over with the frangible sleeve 30 as well as the frangible ring 20 broken away, there is very little chance of the vehicle wheel striking the upper end of the lower section of the valve stem 26 to cause damage to itself or the hydrant valve (not shown). Also, there is less danger of the hydrant valve being knocked off its seat and, thus, causing localized flooding.

Referring now in more detail to the coupling 28 it will be noted that the coupling sleeve 30 is provided with a first transversely extending bore 34 positioned above the groove 32 and a second transversely extending bore 36 positioned below the groove 32. The transversely extending bore 34 extends through both walls of the tubular sleeve 30 and is unthreaded. A transversely extending bore 38 in the lower end portion of the upper valve stem section 24 is arranged to align with the bore 34 in coupling sleeve 30 and a pin 40 is adapted to be force-fitted into the aligned bores so as to retain the sleeve 30 on the stem section 24 and prevent rotation of the same relative to the stem section 24. It will be appreciated that in the initial installation of the fire hydrant, the stem section 24 may have the sleeve 30 attached thereto at a shop site and then when it is desired to couple the stem section 24 to the stem section 26, the stem section with the coupling sleeve 30 may be applied directly to the stem section 26 prior to attachment of the upper barrel section 12 to the lower barrel section 14.

The transversely extending bore 36 in the coupling sleeve 30 is provided with interior threads 42 along a portion of the same where it passes through one wall of the tubular sleeve. The other portion of the bore 36 is unthreaded as indicated at 44 and has a diameter smaller than the inside diameter of threads 42.

Referring now to FIGURE 2, a pin or bolt 46 for securing the coupling sleeve 30 to the upper end of the lower valve stem section 26 is provided with exterior threads 48 adjacent one end thereof. Threads 48 are complementary to the threads 42 and extend along the length of the pin a distance substantially equal to the thickness of the wall of sleeve 30. The remaining portion 50 of pin 46 is unthreaded. A boss 51 on the exterior of the sleeve 30 surrounds the end of the bore 36 having the threads 42, the boss being provided with a planar surface 49. The purpose of boss 51 will be described later in the specification.

The upper portion of the lower valve stem section 26 is provided with a transverse unthreaded bore 52 which is arranged to be aligned with the bore 36 of the coupling sleeve 30. Pin or stud 46 is further provided in its threaded end with a non-circular axially extending recess 54 which is, preferably, hexagonal in cross-section. As illustrated in FIGURE 1, the non-circular recess 54 is arranged to receive a similarly shaped non-circular tool or wrench 56 for threading and unthreading the pin 46 into and from the threads 42 of bore 36. The diameter of the unthreaded portion 50 of pin 46 is, preferably, made so that the unthreaded portion 50 can slide in the unthreaded portions of bores 36 and 52. When removing the pin 46 from the bores 36 and 52 after the threads 48 of the pin have cleared the threads 42, the rust and corrosion of the pin in the unthreaded portion of the bores 36 and 52 is such that the pin is substantially frozen and cannot be freed by sliding by hand. This quite frequently occurs, especially if the coupling has been in use for a considerable period of time and, thus, even though the pin can be rotated by the use of a suitable non-circular tool inserted into the recess 54 to unthread the pin at least from the threads 42 in the bore 36, the pin 46 cannot then be further removed by pulling on it by hand or with pliers.

Referring now to FIGURES 4 through 8 inclusive there is generally indicated at 58 an improved tool capable of use in the novel method for removing the pin 46 from the coupling sleeve 30 and the lower valve stem section 26 and for subsequently removing the remaining portion of frangible sleeve 30 from the valve stem section 26 when the coupling sleeve 30 has been broken, the method being described later in the specification.

In more detail, the improved tool 58 includes a body member 60 which is shown as a generally U-shaped or semi-cylindrical elongate backing element or housing. The body member is closed at one end by a wall 62 and is provided with an opening 64 at its opposite end, and the distance between the closed end wall 62 and the opposite opening 64 of the body member 60 is slightly greater than the length of the damaged lower portion of the coupling sleeve 30 thereby allowing the body member 60 to be placed around the damaged portion as shown in FIGURES 5 and 6.

The opening 64 is defined by the arcuate flange member 66 which is turned inwardly toward the center axis of the body member 60, the flange member being adapted to straddle the valve stem section 26 while at the same time providing an interior abutting surface 68 for engagement against a lower face 70 of the damaged lower portion of the coupling sleeve. It can be seen from the drawings that the flange member 66 is turned inwardly from the wall of the body member 60 for a distance which is approximately equal to the thickness of the wall of the damaged coupling sleeve 30 thereby providing an adequate abutting surface at 68 when the flange member is placed in straddling position around the valve stem section 26 at its junction with the damaged coupling sleeve 30.

The body member 60 is further provided with an enlarged bore or opening 72 which is located in the elongate backing wall portion of the body member and which provides an opening in the body member through which the coupling pin 46 may be pulled during its removal from the bores of the valve stem section 26 and the damaged portion of the sleeve 30. The bore 72 must be sufficiently large and so located that it may be placed over the boss 51 of the damaged portion of the coupling sleeve 30 thereby providing a more secure relationship between the tool 58 and the damaged sleeve when the tool is used for removing the coupling pin 46. It can be appreciated that the boss 51, when placed within the bore 72, will prevent any extreme shifting of the entire tool 58 during its use. Also the bore 72 must be large enough to receive another portion of the tool as will be described later in the specification.

The end wall 62 at the closed end of the body member 60 carries on its external side a boss 74 through which is formed an internally threaded passage 76 extending through both the boss 74 and the end wall 62. The boss 74 is so positioned on external wall 62 that it overlays a top face 78 of the valve stem section 26 when the tool or apparatus is in position for removing the coupling pin and the damaged portion of the coupling sleeve. It can be seen from the drawing that the axis of the internally threaded passage 76 is parallel to or substantially coaxial with the longitudinal axis of the valve stem section 26 when the tool is in a position of use and thereby provides a passage for directly applying a force to the top face 78 of the valve stem section 26. A suitable means for applying this force is a screw member 80 which is formed from a stud or rod having external threads mating with the internal threads of the passage 76. The screw member 80 includes a flat face 81 at its one end for engagement with the top face 78 of the valve stem section, and at its other end the screw member 80 carries head 83 having a noncircular recess 82 which is adapted to receive one or the other of stud members 84 and 86 of the ratchet wrench 56. The head portion has a knurled outer surface 88 which provides a means for manually gripping and rotating the screw member 80 for the purpose of adjusting the screw along its longitudinal axis with respect to the body member 60.

Also carried on the outer surface of the wall 62 is a boss-like member 90 formed integral with the outer surface of the wall and which includes an internally threaded passage 92. A second screw member 94 is threadedly received in the threaded passage 92 of the member 90. The passage 92 has an axis which is at right angles and spaced from the axis of the internally threaded passage 76. Also, the axis of the passage 92 is parallel to and spaced from the longitudinal axis of the enlarged bore or opening 72 so that when the tool 58 is in operative position for removing the coupling pin, the screw member 94 is parallel to the pin.

The screw member 94 is formed from a stud or rod having external threads which mate with the threads of the internal passage 92. A non-circular recess 96 is provided in a driven end 98 of the screw member 94, the recess being adapted to receive one or the other of the noncircular stud members 84 and 86 of the ratchet wrench 56 when the same is used to drive the screw member. The opposite end of screw member 94, which is unthreaded, carries a connector arm 100 for pivotal movement in plane transverse of the axis of the screw member 94. Thus, when the screw member 94 is rotated the connector arm 100 may be maintained in a predetermined position along the outside of the elongate backing wall of the body member 60. The connector arm 100 extends at right angles and downwardly from screw member 94 along the outside backing wall, and is retained on the end of the screw 94 by a suitable split retaining lock ring 102. Integral with or fixed to the screw member 94 is an enlarged knob element 104 having a knurled surface and positioned adjacent the connector arm junction with screw member. The element 104 provides means for manually turning screw member 94 for adjusting the position of the screw member relative to the body of the tool, and this adjustment, in turn, changes the relative distance of connector arm 100 from the backing wall portion of the tool body 60. A more detailed description of the purpose of knob 104 will be described later in the specification. A thrust washer 105 is positioned intermediate the connector arm 100 and the knob 104 so that the connector arm may rotate freely relative the screw and its knob.

The connector arm 100 has a free end 106 provided with an unthreaded bore 108. The bore 108 is so positioned on the arm 100 that it is aligned with the axes of coupling pin 46 and the aligned bores 36 and 52 of the damaged portion of coupling sleeve 30 and valve stem section 26, respectively when the arm has been pivoted to a proper position. Bore 108 carries a bushing member 110 having an enlarged head 112 and a sleeve 114 of a diameter to fit in and rotate relative to the bore 108. The bushing member 110 is retained in position within the bore 108 at the end 106 of the connector arm by any suitable split retaining lock ring means 116. Bushing member 110 includes an interiorly threaded portion 118 for receiving the exterior threads 48 of the coupling pin 46, when the tool is placed in position for removing the pin. A knurled surface 113 is provided on the enlarged head 112 of bushing member 110 in order to provide for manual threading of the bushing member onto the coupling pin head as will be described in the specification.

The use of the tool may be best described by reference to the novel method of removing the pin 46 and the damaged portion of the coupling sleeve 30 from a damaged hydrant coupling. Should the hydrant be knocked over and the sleeve 30 sheared along its weakened portion or groove 32, the pin 46 is removed from the coupling sleeve 30 by first inserting the stud 86 of the wrench 56 into the recess 54 of the pin. It will be noted that the stud 86 extends from the opposite side of the ratchet wrench 56 than does the stud 84; consequently, the stud 86 operates in a reverse or unthreading direction when the ratchet wrench 56 is actuated. The stud 84 is a driving stud which may be used for threading or rotating in a forward direction and of course is used in inserting the pin as shown in FIGURE 1. With the stud 86 in place within the recess 54, the wrench is operated to unthread the pin 46 from the threaded portion 42 of the bore 36. When the threads 48 of the bolt or pin 46 are completely clear of the threads 42, then the pin may be moved axially from the bore if such pin has a loose fit with respect to the bore 52 of the valve stem section 26. On the other hand, and is usually the case, if the pin is either tight fitting at installation or has been installed for a considerable length of time with rust or corrosion freezing the pin, then the pin cannot be slid axially by hand even though it has been rotated during its unthreading. When this occurs the tool 58 is lowered into the lower hydrant barrel section 14 to a position where the body member 60 is adjacent to the area of the damaged sleeve 30 from which the pin 46 is to be removed. Then body member 60 is moved toward the valve stem section 26 until the opening 64 partially surrounds the stem section. From this position the tool is moved toward the damaged portion of the sleeve 30 and positioned so that the bore 72 surrounds the boss 51 and abuts against the periphery of the sleeve 30. Then the bushing member 110 is brought into precise alignment with the coupling pin 46 by manual movements of the tool body 60 and connector arm 100.

Once the bushing member 110 is in aligned contact with the threaded head 48 of the pin, it is turned manually to thread the bushing onto the threaded head of the coupling pin. While the busing member 110 is being treaded onto the threaded coupling pin head 48, it is necessary to move the entire tool 58 toward the damaged coupling sleeve 30 if the arm 100 and screw member 94 have not been backed off to the left from the position shown in FIGURE 5 in order to accommodate the feeding movement of the bushing member while it is being threaded into engagement with the coupling pin head. However, it is preferable not to shift the entire tool 58 during the required feeding movement of the bushing member 110 and thus the connector arm 100 and the screw member 94 are shifted to the left of FIGURE 5 so that the body member 60 can be positioned as described above. When this is done, the knurled element 104 is turned at a rate to match the feed required to thread the bushing member 110 onto the threaded coupling pin head 48. The manual turning of both the knurled element 104 and the bushing element 110 can be easily accomplished at the same time by a single operator who has both hands free to adjust the tool once it is initially positioned in the lower hydrant barrel with the closed end wall portion 62 resting on the top surface of the damaged coupling sleeve 30. It is not contemplated that the tool will necessarily remain at rest with the end wall 62 contacting the upper surface of the damaged coupling sleeve 30, however, the design of the tool does allow this initial resting position in order that the operator may freely manipulate and adjust the tool for ultimate removal of the coupling pin and the damaged sleeve portion.

When the threading step just described is completed, the bushing member 110 is in a gripping relationship to the coupling pin and retains the pin during subsequent steps of its removal and also during the final steps of removing the damaged coupling sleeve from the lower valve stem section. With the threading step complete, and the pin being gripped by the bushing member the ratchet wrench 56 with its driving stud 84 is placed in the recess 96 of the screw member 94 and is operated to drive the screw member 94 in a direction which will cause the screw member to carry the connector arm 100 outwardly from the coupling sleeve 30 (to the left of FIGURE 5), thus pulling the coupling pin 46 axially from engagement with the valve stem 26 and the sleeve 30. This application of force on the screw member 94 is continued until the connector arm 100 with its bushing member 110 has carried the coupling pin completely clear of any engagement with the valve stem section 26. It will be appreciated that it is not necessary to carry the pin entirely clear of any engagement with the damaged coupling sleeve 30 as the coupling sleeve is to be removed during an operation which immediately follows the removal of the coupling pin.

Normally, the tool will be used to not only remove the coupling pin 46 from engagement with the valve stem section 26 but also to remove the damaged portion of coupling sleeve 30 from the valve stem section 26, and with this tool and the novel method it is not necessary to remove the tool from the lower hydrant barrel until both the coupling pin and the damaged coupling sleeve are ready for removal as a unit with the tool itself.

The damaged sleeve 30 may be removed by driving the screw member 80 downwardly toward the valve stem. The screw member 80 may be initially rotated manually by means of its knurled outer surface 88, but once contact is made with the top face 78 of the valve stem section 26, it is necessary to rotate the screw member by means of the ratchet wrench 56 which is placed in driving engagement with its stud 84 within the recess 82 of the screw member. Upon engagement of the lower end of the screw member 80 with the top face 78 of the valve stem section 26, further turning of the screw member 80 causes the flange element 66 to move against the lower face 70 of the damaged coupling sleeve 30. The abutting surface 68 of the flange 66 exerts an upward force on the coupling sleeve 30 while the downward force from the screw member 80 is being applied to the valve stem section 26. Since the coupling pin 46 has been removed so as to be clear of any contact with the valve stem section 26, continued downward movement of the screw member 80 results in an eventual separation of the damaged coupling sleeve 30 from the end of the valve stem section 26.

At this point it can be seen that the tool can be removed from the lower hydrant barrel by manually lifting it from the confines of that barrel. The tool carries with it the removed coupling pin 46 which is still held in a gripping relationship with the bushing member 110, and also the tool carries the damaged coupling sleeve portion 30 which is retained by the flange member 66 and the screw member 80 which is now in a position within the bore of the coupling sleeve 30. The removed coupling pin and damaged coupling sleeve are lifted from the lower hydrant barrel as a unit with the tool.

Although the improved tool has been described primarily in a use for removing the coupling pin and damaged coupling sleeve from the lower valve stem section of a damaged hydrant, it can readily be seen that the same tool can be used for removing the upper half of the damaged sleeve 30 from the upper valve stem section 24. In this operation, it is first necessary to remove the pin 40 in some conventional manner if this pin is of the force fit type. After the removal of that pin, the tool 58 can be used with its screw member 80 to remove the damaged sleeve portion from the upper valve stem section 24 in the same manner as described above for the lower valve stem section. It is further contemplated that the hydrant coupling may include an upper coupling pin of the novel type disclosed herein and having a threaded head similar to the pin 46 to replace the conventional force fitting pin 40 in the upper stem section 24. If such a threaded coupling pin were used in the upper stem section of the coupling it will be appreciated that the tool 58 could be used to remove both of the coupling pins and both of the damaged sleeve portions from the two separated valve stem sections.

It will thus be seen that the objects and advantages of this invention have been fully and effectively accomplished. It will be realized, however, that the foregoing specific embodiments of the invention have been shown and described only for the purpose of illustrating the principles of the invention and is subject to some modification and changes without departing from such principles. Therefore, the terminology used throughout the specification is for the purpose of description and not limitation, the scope of the invention being defined in the claims.

What is claimed is:

1. An apparatus for removing a coupling pin and a damaged sleeve portion from coupling engagement with the valve stem in a fire hydrant coupling, the pin having exterior threads on one end with the remaining portion being unthreaded, and the sleeve having a bore with interior threads at one end with the remainder of the bore being unthreaded, and the valve stem having an unthreaded bore in alignment with the bore of the sleeve for coupling engagement with the pin, said apparatus comprising: a backing member having abutting means for engaging the valve stem and/or the damaged sleeve portion during the removal of the pin, a first force applying means carried by said backing member and movable relative thereto in a predetermined direction normal to said abutting means for applying a removal force to the pin, gripping means for holding the threaded head of the pin during its removal, means operatively supporting said gripping means on said first force applying means for transmitting the force from the first force applying means to the gripping means, a second force applying means carried by and movable relative to said backing means in a predetermined direction transverse to the direction of movement of said first force applying means for applying a force to the stem, and means on said backing member for fixedly engaging the same with the sleeve portion during the removal of the sleeve portion from the valve stem, said last mentioned means applying a reaction force opposing the direction of movement of said second force applying means relative to the backing member.

2. An apparatus as claimed in claim 1 in which said gripping means comprises a threaded bushing adapted for threaded engagement with the threaded head of the pin.

3. An apparatus as claimed in claim 1 in which the two force applying means comprise screw members rotatable to exert forces along their longitudinal axes.

4. An apparatus for removing a coupling pin and a damaged sleeve portion from coupling engagement with the lower section of a two-section valve stem in a fire hydrant, the pin having exterior threads on one end with the remaining portion being unthreaded and further having a non-circular recess in the threaded end, and the sleeve having a bore with interior threads at one end with the remainder of the bore being unthreaded, and the lower valve stem section having an unthreaded bore in alignment with the bore of the sleeve for coupling engagement with the pin, said apparatus comprising an elongated backing member for abutting the valve stem section and its associated sleeve portion, a first screw means for applying a removal force to the pin along a path which is parallel to and spaced from the longitudinal axis of the pin, connector means for transmitting the removal force from the first screw member to the pin which is to be removed, gripping means carried by the connector means for engaging the head of the pin during the application of the removal force to the pin, a second screw means for applying a removal force to the valve stem section, said second screw means being carried at right angles to said first screw means and on a longitudinal axis which is essentially coincident with the longitudinal axis of the valve stem section, means for engaging the sleeve with a force which is opposite to the removal force of the second screw means whereby the sleeve will be separated from the valve stem section upon application of the removal force from the second screw means.

5. An apparatus for removing a coupling pin and a damaged sleeve portion from coupling engagement with a section of a two section valve stem, the pin having exterior threads on one end for threading engagement with a threaded portion of a bore in the coupling sleeve, the remaining portion of the pin being unthreaded for reception in an unthreaded portion bore in the vale stem section, the pin further having a non-circular recess in the threaded end thereof, said apparatus comprising: an elongated, generally semi-cylindrical body member arranged at least partially to fit around the sleeve portion, said body member having an enlarged aperture therein for aligning the body member with and receiving the threaded end of the pin after it has been unthreaded from the sleeve; screw means supported on said body member and including a screw element having a longitudinal axis transverse of the longitudinal axis of the semi-cylindrical body member and parallel to and spaced from the longitudinal axis of the aperture in the body member, the screw member being moved axially relative to the body member; a connector arm pivotally connected to one end of said screw element for pivotal movement relative said screw element on an axis parallel to the same and for rectilinear movement therewith, said connector arm having a free end with an opening therein; a bushing member rotatably supported in the opening in said connector arm, said bushing member having interior threads for threadedly receiving the end of the pin when the pin has been unthreaded from the threads of the sleeve portion, and means on the other end of said screw element for advancing the same transversely of the longitudinal axis of the body member to thereby cause said connector arm and bushing member to withdraw the pin from at least the valve stem.

6. An apparatus as claimed in claim 5 including means on said bushing member and on said screw element whereby said screw element and its connector arm are advanced relative to the body member at a rate to match the threading of the bushing element onto the threaded end of the pin.

7. An apparatus as claimed in claim 6 in which said last-mentioned means includes a knurled head on said bushing member for manually rotating the same and a knurled knob fixedly secured to said screw element for manually rotating the same on its axis.

8. An apparatus as claimed in claim 5 in which one end of said semi-cylindrical body member is provided with a closed end wall and an opposite end is open, said closed end wall having a boss on the outer surface thereof, said end wall and boss having a bore therethrough which is interiorly threaded, said body member having an arcuate inturned flange adjacent its open end arranged to receive the valve stem, the flange abutting one end of the sleeve portion, a screw member threadedly received in the bore through the boss and a closed end wall of said body member, said screw element having an axis transverse to the axis of said first screw element and at least parallel to the axis of the valve stem when the body member is applied thereto so that said screw member can engage the end of the valve stem to cause said body member to move relative the valve stem with the inturned flange abutting the sleeve portion and removing the same from the valve stem.

9. An apparatus as claimed in claim 8 in which said screw member includes a head on its end opposite the end engaging the valve stem, said head having a first means for turning the screw member by hand and a second means for turning the screw element by a tool.

10. An apparatus as claimed in claim 9 in which said first means includes a knurled surface on the periphery of said head and in which said second means is an axially extending non-circular polygonal recess in cross section.

References Cited

UNITED STATES PATENTS

| | | | |
|---|---|---|---|
| 1,241,846 | 10/1917 | Grons | 29—264 |
| 1,519,067 | 12/1924 | Smith | 29—256 |
| 2,075,792 | 4/1937 | Curtiss | 29—257 |
| 2,872,728 | 2/1959 | Fraser | 29—256 |
| 2,965,958 | 12/1960 | Gribble | 29—257 X |

OTHELL M. SIMPSON, *Primary Examiner.*

WILLIAM F. O'DEA, W. FELDMAN, *Examiners.*

J. C. PETERS, R. GERARD, *Assistant Examiners.*